(12) United States Patent
Schuck

(10) Patent No.: US 11,325,440 B2
(45) Date of Patent: May 10, 2022

(54) AXLE ASSEMBLY HAVING A CROSS BRACE

(71) Applicant: ArvinMeritor Technology, LLC, Troy, MI (US)

(72) Inventor: Luis Gustavo Schuck, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/014,548

(22) Filed: Sep. 8, 2020

(65) Prior Publication Data

US 2022/0072926 A1    Mar. 10, 2022

(51) Int. Cl.
*B60G 21/055*   (2006.01)
*B60G 9/00*   (2006.01)

(52) U.S. Cl.
CPC ......... *B60G 21/0551* (2013.01); *B60G 9/003* (2013.01); *B60G 2200/31* (2013.01); *B60G 2206/20* (2013.01)

(58) Field of Classification Search
None
See application file for complete search history.

(56) References Cited

U.S. PATENT DOCUMENTS

| | | | |
|---|---|---|---|
| 6,129,367 A * | 10/2000 | Bublies ................. | B60G 7/001 180/349 |
| 8,235,422 B2 | 8/2012 | Carr et al. | |
| 9,422,014 B1 | 8/2016 | Schuck | |
| 2005/0082814 A1* | 4/2005 | Ramsey .............. | B62D 53/068 280/793 |

FOREIGN PATENT DOCUMENTS

WO    WO-2007062448 A1 *   6/2007   ............... B60G 3/18

OTHER PUBLICATIONS

Meritor Heavy Vehicle Systems, LLC, "Meritor Trailer Products," copyright 2012, Meritor, Inc., Troy, Michigan; 12 Pages.
Meritor, "Layout MTA-Tec6-23T," revised Feb. 3, 2020, Meritor, Inc., Troy, Michigan; 2 Pages.
Meritor, "MTA Top Mount Installation Drawing," revised Feb. 13, 2020, Meritor, Inc., Troy, Michigan; 1 Page.

* cited by examiner

*Primary Examiner* — Faye M Fleming
(74) *Attorney, Agent, or Firm* — Brooks Kushman PC

(57) ABSTRACT

An axle assembly that includes first and second hanger brackets and at least one cross brace. The first and second hanger brackets may be spaced apart from each other and may be adapted to be mounted to a chassis of a vehicle. The cross brace may extend from the first hanger bracket to the second hanger bracket.

20 Claims, 5 Drawing Sheets

AXLE ASSEMBLY HAVING A CROSS BRACE

TECHNICAL FIELD

This disclosure relates to an axle assembly having at least one cross brace that extends between a pair of hanger brackets.

BACKGROUND

A frame for a heavy-duty vehicle is disclosed in U.S. Pat. No. 8,235,422.

SUMMARY

In at least one embodiment, an axle assembly is provided. The axle assembly may include first and second hanger brackets and a first cross brace. The first and second hanger brackets may be spaced apart from each other and may be adapted to be mounted to a chassis of a vehicle. The first cross brace may extend from a first end to a second end. The first end may engage the first hanger bracket. The second end may engage the second hanger bracket. The first cross brace may include a first segment and a second segment. The first segment may extend along a first segment axis from the first end to the second segment. The second segment may extend along a second segment axis that differs from the first segment axis from the second end to the first segment. The first segment axis and the second segment axis may intersect such that the first segment and the first segment axis are disposed at an oblique angle with respect to the second segment and the second segment axis.

In at least one embodiment, an axle assembly is provided. The axle assembly may include first and second hanger brackets and first and second cross braces. The first and second hanger brackets may be spaced apart from each other and may be adapted to be mounted to a chassis of a vehicle. The first and second hanger brackets may pivotally support first and second trailing arms, respectively, that may extend from an axle. The first and second cross braces may have the same configuration and may each extend from a first end to a second end. The first and second ends of the first cross brace may engage the first and second hanger brackets, respectively. The first and second ends of the second cross brace may engage the second and first hanger brackets, respectively. The first and second cross braces may each have a front side and a back side that is disposed opposite the front side. The back side of the first cross brace may engage the back side of the second cross brace.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
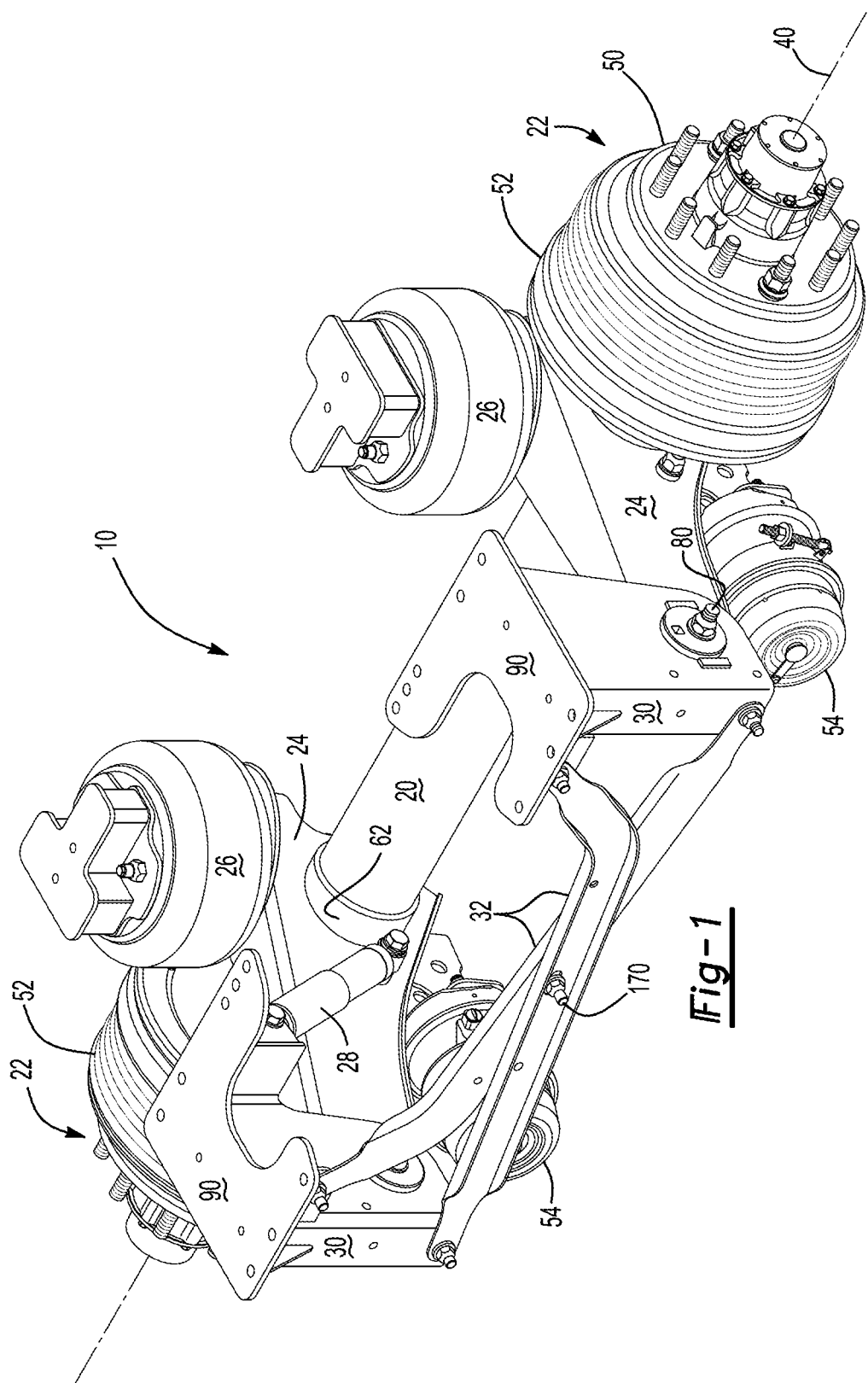
FIG. 1 is a perspective view of an example of an axle assembly.

Referring to FIG. 1, an example of an axle assembly 10 is shown. The axle assembly 10 may be provided with a vehicle, such as motor vehicle or a trailer that may be provided with a motor vehicle. The axle assembly 10 may include an axle 20 that may support a wheel end assembly 22. The axle assembly 10 may also include a trailing arm 24, an air spring 26, a shock absorber 28, and a hanger bracket 30. These components may be provided in pairs and may be grouped together and positioned near a corresponding wheel end assembly 22. The axle assembly 10 may also include at least one cross brace 32.

Figure 2:
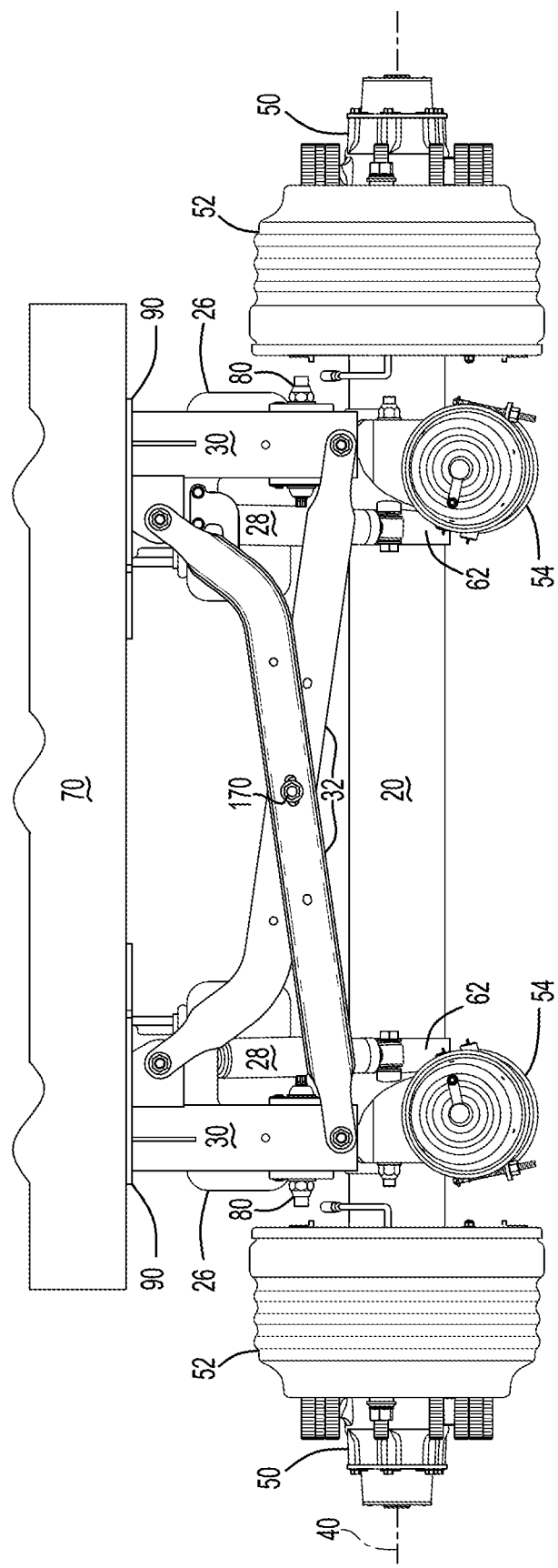
FIG. 2 is a side view of the axle assembly.

Referring to FIGS. 1 and 2, the axle 20 may extend along an axle axis 40. The axle 20 may have a generally tubular or cylindrical configuration and may provide a structure that may support and facilitate mounting of other components of the axle assembly 10.

Referring to FIG. 1, a wheel end assembly 22 may be mountable at an end of the axle 20. In the configuration shown, two wheel end assemblies 22 are provided and are mounted at opposing ends of the axle 20. A wheel end assembly 22 may include a hub 50 and a brake sub system.

The hub 50 may be rotatably disposed on the axle 20. The hub 50 may be rotatable about the axle axis 40 and may facilitate mounting of a wheel upon which a tire may be mounted. For example, the hub 50 may include a plurality of mounting studs that may extend through a wheel in a manner known by those skilled in the art.

The brake subsystem may be configured to brake or inhibit rotation of an associated hub 50. The brake subsystem may be mounted to the axle 20 proximate an end of the axle 20. The brake subsystem may be configured as a friction brake, such as a drum brake or a disc brake. In the configuration shown in FIG. 1, the brake subsystem is configured as a drum brake and may include a pair of brake pads that may be received inside a brake drum 52. A brake actuator 54 may actuate the brake pads into engagement with the brake drum 52 to provide a brake torque that may slow or stop rotation of an associated hub 50 in a manner known by those skilled in the art.

Figure 3:
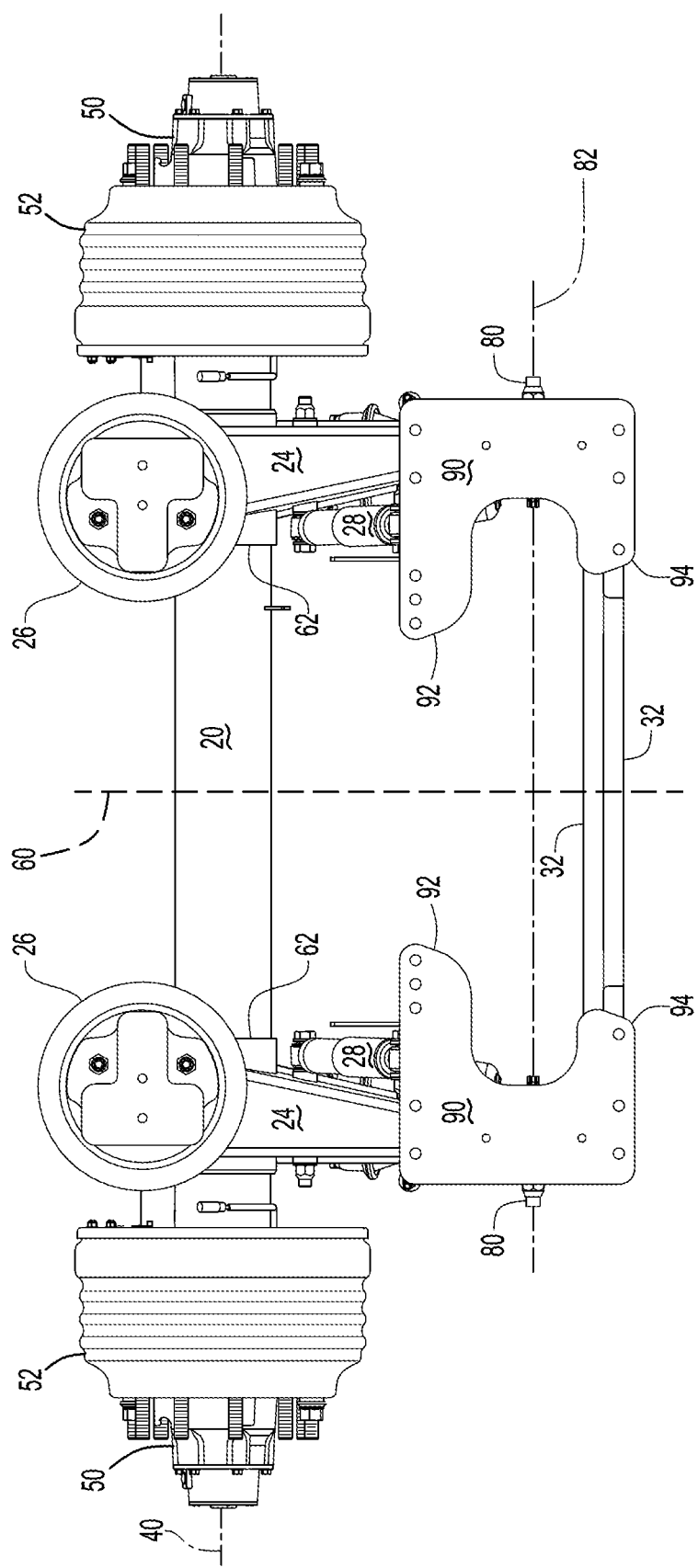
FIG. 3 is a top view of the axle assembly.

Referring to FIGS. 1 and 3, the trailing arm 24 may extend between the axle 20 and a corresponding hanger bracket 30. Two trailing arms 24 are illustrated that are spaced apart from each other. The trailing arms 24 may have the same configuration or a similar configuration. For instance, the trailing arms 24 may have mirror symmetry with respect to the center plane 60 that may bisect the axle 20 or may be centered between the trailing arms 24, the hanger brackets 30, or combinations thereof. The trailing arm 24 may be fixedly coupled to the axle 20 in any suitable manner. For example, the trailing arm 24 may be secured to an axle wrap 62 that may be fixedly disposed on the axle 20 and that may extend at least partially around an exterior surface of the axle 20. The trailing arm 24 may extend away from the axle 20 and may be pivotally coupled to a corresponding hanger bracket 30. The trailing arm 24 may have a generally hollow construction.

Referring to FIGS. 1-3, an air spring 26 may be mounted to the trailing arm 24. For example, the air spring 26 may be disposed proximate an end of the trailing arm 24 that may be disposed opposite the hanger bracket 30. The air spring 26 may extend from the trailing arm 24 to a frame or chassis 70 of the vehicle, which is best shown in FIG. 2. The air spring 26 may be configured to dampen vibrations associated with vehicle travel, provide a desired level of ride quality, control vehicle ride height, or combinations thereof.

Referring to FIGS. 1-3, a shock absorber 28 may be provided to dampen impulses and to dissipate kinetic energy transmitted to the axle assembly 10. The shock absorber 28 may be pivotally mounted to the hanger bracket 30 at a first end and may be pivotally mounted to the trailing arm 24 at a second end that may be disposed opposite the first end.

Figure 4:
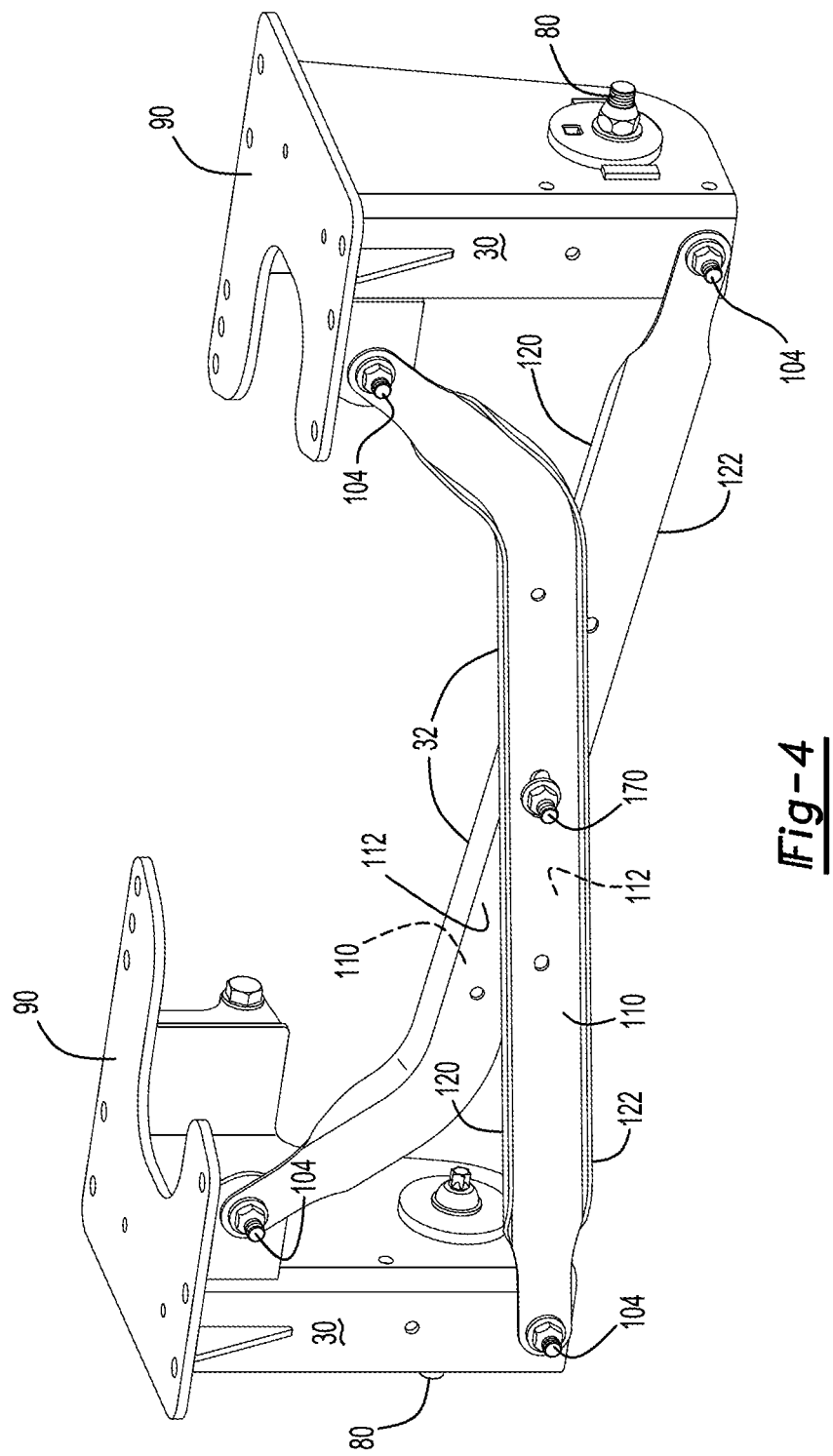
FIG. 4 is a perspective view of a portion of the axle assembly including first and second hanger brackets and first and second cross braces.
Figure 5:
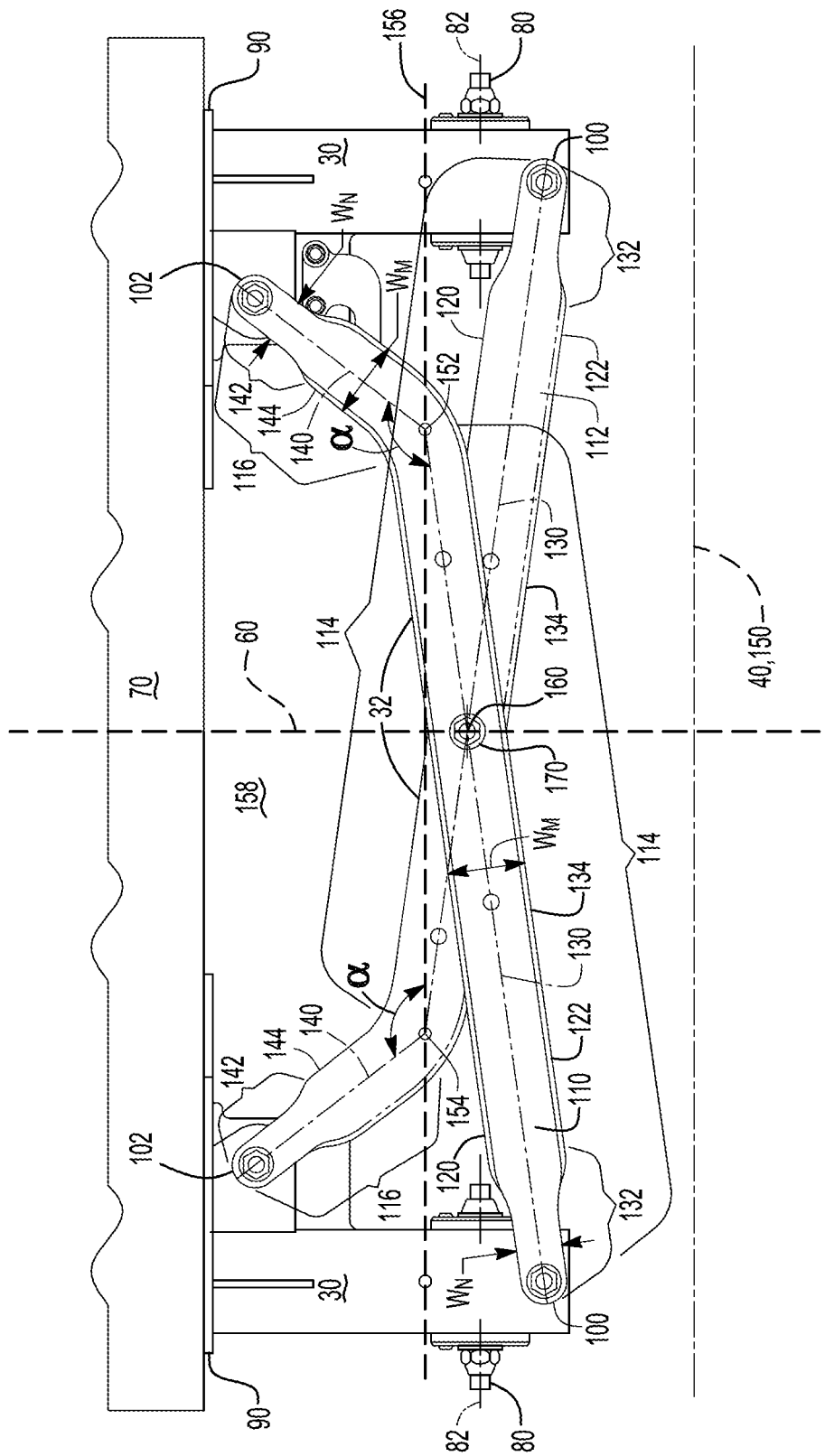
FIG. 5 is a side view of the portion of the axle assembly shown in FIG. 4.

Referring primarily to FIGS. 2, 4 and 5, the hanger bracket 30 may facilitate mounting of the axle assembly 10 to the chassis 70 of the vehicle. In these figures, two hanger brackets 30 are illustrated that are spaced apart from each other. The hanger brackets 30 may have the same configuration or a similar configuration. For instance, the hanger brackets 30 may have mirror symmetry with respect to the center plane 60.

The hanger bracket 30 may have a generally hollow box-like configuration and may receive an end of the trailing arm 24. A pivot pin 80 may rotatably couple the trailing arm 24 to the hanger bracket 30. For example, the pivot pin 80 may extend along a pivot axis 82 and may extend through the hanger bracket 30 and the trailing arm 24 to pivotally support and rotatably couple the trailing arm 24 to the hanger bracket 30 such that the trailing arm 24 may be rotatable about the pivot axis 82 with respect to the hanger bracket 30. As is best shown in FIG. 3, the pivot axis 82 may extend substantially parallel to the axle axis 40. Unless otherwise specified, two features are substantially parallel when they are oriented within ±2° with respect to each other.

Referring to FIGS. 2 and 3, the hanger brackets 30 may be fixedly positioned with respect to the chassis 70. For instance, the hanger bracket 30 may be mounted to the chassis 70 along a top side or at a top plate 90. For example, each hanger bracket 30 may have a C-shaped top plate 90 that may facilitate mounting of the hanger bracket 30 to the chassis 70, such as with one or more fasteners such as bolts. In at least one configuration, the top plate 90 may have a first arm 92 and a second arm 94. The first arm 92 and the second arm 94 may extend in the same direction, such as toward the center plane 20, and may be disposed substantially parallel to each other. The first arm 92 may extend over a shock absorber 28. The second arm 94 may extend over an end of a cross brace 32. For instance, the second arms 94 of the first and second hanger brackets 30, 30 may extend over second ends of first and second cross braces 32, 32, respectively. The first arm 92 may have a greater length in the second arm 94.

Referring to FIGS. 4 and 5, at least one cross brace 32 extend from one hanger bracket 30 to the other hanger bracket 30. In the configuration shown, two cross braces 32 are illustrated. For clarity in reference, the cross braces 32 may be referred to as a first cross brace and a second cross brace. From the perspective shown in FIGS. 4 and 5, the cross brace 32 that extends up and to the right from near the bottom of the left hanger bracket 30 (which may be referred to as a "first hanger bracket") toward the top of the right hanger bracket 30 (which may be referred to as a "second hanger bracket") will be referred to as a first cross brace 32. Conversely the cross brace 32 that extends up and to the left from near the bottom of the right hanger bracket 30 ("second cross brace") toward the top of the left hanger bracket 30 ("first cross brace") will be referred to as a second cross brace 32.

The first cross brace 32 and the second cross brace 32 may have the same configuration. In addition, each cross brace 32 may be configured as a unitary one-piece component that may extend from a first end 100 to a second end 102. The first end 100 and the second end 102 may be the only two ends of the cross brace 32. The first end 100 of a cross brace 32 may be mounted proximate the bottom of a hanger bracket 30. The second end 102 may be disposed opposite the first end 100 and may be mounted proximate the top of the other hanger bracket 30. As such, the first end 100 of the first cross brace 32 may engage first hanger bracket 30 while the second end 102 of the first cross brace 32 may engage the second hanger bracket 30. Similarly, the first end 100 of the second cross brace 32 may engage the second hanger bracket 30 while the second end 102 of the second cross brace 32 may engage the first hanger bracket 30.

The first and second cross braces 32, 32 may be coupled to the first and second hanger brackets 30, 30 in any suitable manner. For instance, the first and second cross braces 32, 32 may be welded to the first and second hanger brackets 30, 30 or may be attached with one or more fasteners 104, such as a screw or bolt and nut.

Each cross brace 32 may have a profile that resembles a hockey stick and that is roughly L-shaped. In at least one configuration and as is best shown in FIG. 5, each cross brace 32 may include a front side 110, a back side 112, a first segment 114, and a second segment 116. Each cross brace 32 may also include a first side wall 120, a second side wall 122, or both.

The front side 110 may extend from the first end 100 to the second end 102. The front sides 110, 110 of the first and second cross braces 32, 32 may face in opposite directions. For instance, the front side 110 of the first cross brace 32 may face away from the axle 20 and the first and second hanger brackets 30, 30. The front side 110 of the second cross brace 32 may face toward the axle 20 and may face toward and may engage the first and second hanger brackets 30, 30.

The back side 112 may be disposed opposite the front side 110. As such, the back sides 112, 112 of the first and second cross braces 32, 32 may face toward each other. For instance, the back side 112 of the first cross brace 32 may face toward the axle 20 and may face toward and may engage the first and second hanger brackets 30, 30. The back side 112 of the second cross brace 32 may face away from the axle 20 and first and second hanger brackets 30, 30. The back side 112 of the first cross brace 32 may contact or engage the back side 112 of the second cross brace 32.

The first segment 114 may extend from the first end 100 to the second segment 116. The first segment 114 may extend along and may be centered about a first segment axis 130. In at least one configuration, the first segment 114 may include a narrowed portion 132 and a main portion 134.

The narrowed portion 132 may extend from the first end 100 to the main portion 134. The narrowed portion 132 or a portion thereof may have a width $W_N$ that is less than the width WM of the main portion 134. Width may be measured in a direction that may be perpendicular the first segment axis 130. In at least one configuration, the narrowed portion 132 may be flat or substantially planar.

The main portion 134 may extend from the narrowed portion 132 to the second segment 116. The main portion 134 may have a length that is greater than the length of the narrowed portion 132. Length of the main portion may be measured in a direction that may be perpendicular to the width or that may extend along the first segment axis 130.

The second segment 116 may extend from the second end 102 to the first segment 114. The second segment 116 may extend along and may be centered about a second segment axis 140. In at least one configuration, the second segment 116 may include a narrowed portion 142 and a main portion 144.

The narrowed portion 142 of the second segment 116 may extend from the second end 102 to the main portion 144 of the second segment 116. The narrowed portion 142 of the second segment 116 may have a similar configuration or the same configuration as the narrowed portion of the first segment 114. As such, the narrowed portion 142 or a portion thereof may have a width $W_N$ that is less than the width WM of the main portion 144 of the second segment 116. In at least one configuration, the narrowed portion 142 may be flat or substantially planar. Moreover, the narrowed portion 132 of the first segment 114 may be aligned with or may be coplanar with the narrowed portion 142 of the second segment 116.

The main portion 144 may extend from the narrowed portion 142 to the first segment 114. The main portion 144 may have a length that is greater than the length of the narrowed portion 142. Length may be measured in a direction that may be perpendicular to the width or that may extend along the second segment axis 140.

The first segment axis 130 and the second segment axis 140 may intersect such that the first segment axis 130 may be disposed at an obtuse or oblique angle α with respect to the second segment axis 140. Accordingly, the first segment 114 may be disposed at an obtuse or oblique angle α with respect to the second segment 116. The first and second segments 114, 116 and the first and second segment axes 130, 140 may be disposed in a nonparallel and non-perpendicular relationship with a horizontal plane 150. The horizontal plane 150 may extend substantially parallel to or parallel to the axle axis 40, the top plates 90, 90 of the hanger brackets 30, 30, or both. In at least one configuration, the axle axis 40 may be completely disposed in the horizontal plane 150. The first and second segment axes 130, 140 of the first cross brace 32 may intersect at a first intersection point 152. The first and second segment axes 130, 140 of the second cross brace 32 may intersect at a second intersection point 154. The first and second intersection points 152, 154 may be disposed along an intersection plane 156. The intersection plane 156 may be disposed parallel to or substantially parallel to the horizontal plane 150. The intersection plane 156 may be disposed further from the horizontal plane 150 than the first ends 100, 100 of the first and second cross braces 32, 32 are disposed from the horizontal plane 150. The intersection plane 156 may also be disposed closer to the second ends 102, 102 of the first and second cross braces 32, 32 than the second ends 102, 102 are disposed to the horizontal plane 150.

The first segment axes 130, 130 of the first segments 114, 114 of the first and second cross braces 32, 32 may intersect at an intersection axis 160. The intersection axis 160 may be disposed perpendicular or substantially perpendicular to the axle axis 40. The intersection plane 156 may be disposed further from the horizontal plane 150 than the intersection axis 160 is disposed from the horizontal plane 150. In addition, the first and second intersection points 152, 154 may be disposed closer to the first and second hanger brackets 30, 30, respectively, than to the intersection axis 160. These characteristics may help provide an opening 158 that is bounded by the first and second cross braces 32, 32 and the chassis 70. The opening 158 may be larger than the openings that are located between the hanger brackets 30 and the first and second cross braces 32, 32.

Referring to FIGS. 4 and 5, the first side wall 120 may be spaced apart from the second side wall 122. The first and second side walls 120, 122 may protrude from the front side 110 and may extend away from the back side 112. The first side wall 120 may be disposed substantially parallel to the second side wall 122 and may be disposed substantially perpendicular to the front side 110. The first and second side walls 120, 122 may be substantially parallel when they are oriented within ±2° with respect to each other. The first and second side walls 120, 122 may be substantially perpendicular when they are oriented within ±2° of a right angle with respect to the front side 110. The first and second side walls 120, 122 may be provided with the main portion 134 of the first segment 114, the main portion 144 of the second segment 116, or both. For instance, the first and second side walls 120, 122 may extend from the narrowed portion 132 of the first segment 114 to the narrowed portion 142 of the second segment 116. Omitting side walls from the narrowed portions 132, 142 may allow the first and second cross braces 32, 32 to face opposite directions while allowing the back sides 112, 112, to contact or engage each other and allow the narrowed portions 132, 142 to be positioned against or closer to a side of the hanger bracket 30 than if the first and second side walls 120, 122 extended the entire length of the first and second cross braces 32, 32. The first and second side walls 120, 122 of the first cross brace 32 may extend away from the axle 20 and the second cross brace 32. The first and second side walls 120, 122 of the second cross brace 32 may extend away from the first cross brace 32 and toward the axle 20.

The first cross brace 32 may be fastened to the second cross brace 32. For instance, the first cross brace 32 may be welded to the second cross brace 32 at one or more locations where the first and second cross braces 32, 32 overlap. As another example, the first cross brace 32 may be attached to the second cross brace 32 with a fastener 170, such as a screw or bolt and nut. For example, the fastener 170 may extend through the first cross brace 32 and through the second cross brace 32 to couple the first cross brace 32 to the second cross brace 32. The holes that receive the fastener 170 may be configured as elongated slots to help ensure the holes overlap.

The axle assembly as described above may provide a larger opening below the chassis and above the cross braces as compared to cross braces that are linear and that may cross each other to form an X. The larger opening may provide room for installation of pneumatic components, such as an air reservoir, hoses, or tubing. The axle assembly may withstand side load forces and provide a desired level of stiffness with only two cross braces. Such cross braces may be lighter than "X" braces and/or braces that employ more than two cross brace members and may require fewer fasteners or welds when fully assembled. Moreover the cross braces may be provided with standardized configurations that may simplify manufacturing and assembly and may help reduce associated costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   first and second hanger brackets that are spaced apart from each other and adapted to be mounted to a chassis of a vehicle; and
   a first cross brace that extends from a first end to a second end, the first end being in engagement with the first hanger bracket and the second end being in engagement with the second hanger bracket, the first cross brace including a first segment and a second segment, wherein the first segment extends along a first segment axis from the first end to the second segment, the second segment extends along a second segment axis from the second end to the first segment, and the first segment axis and the second segment axis intersect such that the first segment and the first segment axis are disposed at an oblique angle with respect to the second segment and the second segment axis.

2. The axle assembly of claim 1 wherein the first segment has a greater length than the second segment.

3. The axle assembly of claim 1 wherein the first segment includes a main portion and a narrowed portion, wherein the narrowed portion extends from the first end to the main portion and has a width that is less than a width of the main portion.

4. The axle assembly of claim 3 wherein the first cross brace has front and back sides that extend from the first end to the second end, the front side being disposed opposite the back side, wherein the main portion has a pair of side walls that are spaced apart from each other and extend away from the back side.

5. The axle assembly of claim 4 wherein the back side faces toward the first and second hanger brackets.

6. The axle assembly of claim 4 wherein the narrowed portion is substantially planar and the side walls extend from the narrowed portion to the second segment.

7. The axle assembly of claim 4 wherein the side walls are disposed substantially parallel each other and substantially perpendicular to the front side.

8. The axle assembly of claim 4 wherein the second segment includes a main portion and a narrowed portion, wherein the narrowed portion of the second segment extends from the second end to the main portion of the second segment and has a width that is less than a width of the main portion of the second segment.

9. The axle assembly of claim 8 wherein the side walls extend from the narrowed portion of the first segment to the narrowed portion of the second segment.

10. The axle assembly of claim 4 further comprising a second cross brace and wherein the side walls extend away from the second cross brace.

11. An axle assembly comprising:
    first and second hanger brackets that are spaced apart from each other and adapted to be mounted to a chassis of a vehicle, wherein the first and second hanger brackets pivotally support first and second trailing arms, respectively, that extend from an axle; and
    first and second cross braces that have the same configuration and that each extend from a first end to a second end, wherein the first and second ends of the first cross brace engage the first and second hanger brackets, respectively, and the first and second ends of the second cross brace engage the second and first hanger brackets, respectively, and wherein the first and second cross braces each have a front side and a back side that is disposed opposite the front side, wherein the back side of the first cross brace engages the back side of the second cross brace, the first cross brace and the second cross brace each include a first segment and a second segment, the first segment extends along a first segment axis from the first end to the second segment, the second segment extends along a second segment axis from the second end to the first segment, and the first segment axis and the second segment axis intersect such that the first segment and the first segment axis are disposed at an oblique angle with respect to the second segment and the second segment axis.

12. The axle assembly of claim 11 wherein the back side of the first cross brace engages the first and second hanger brackets and the front side of the second cross brace engages the first and second hanger brackets.

13. The axle assembly of claim 11 wherein the first and second cross braces each have a pair of side walls that are spaced apart from each other and extend away from the back side such that the pair of side walls protrude with respect to the front side, wherein the pair of side walls of the first cross brace extends away from the axle and the second cross brace and the pair of side walls of the second cross brace extends away from the first cross brace and toward the axle.

14. The axle assembly of claim 11 wherein a fastener extends through the first cross brace and the second cross brace and couples the first cross brace to the second cross brace.

15. The axle assembly of claim 11 wherein the first and second segments and the first and second segment axes are disposed in a nonparallel and non-perpendicular relationship with a horizontal plane in which an axle axis is completely disposed.

16. The axle assembly of claim 15 wherein the first and second segment axes of the first cross brace intersect at a first intersection point, the first and second segment axes of the second cross brace intersect at a second intersection point, the first and second intersection points are disposed along an intersection plane that is disposed further from the horizontal plane than the first ends of the first and second cross braces are disposed from the horizontal plane.

17. The axle assembly of claim 16 wherein the first segment axes intersect an intersection axis that is disposed perpendicular to the axle axis, wherein the intersection plane is disposed further from the horizontal plane than the intersection axis is disposed from the horizontal plane.

18. The axle assembly of claim 17 wherein the first and second intersection points are disposed closer to the first and second hanger brackets, respectively, than to the intersection axis.

19. The axle assembly of claim 16 wherein the first and second hanger brackets each have a C-shaped top plate that facilitates mounting to the chassis, wherein the top plate has a first arm and a second arm, wherein the first arms of the top plates extend over corresponding shock absorbers and wherein the second arms of the top plates of the first and second hanger brackets extend over the second ends of the first and second cross braces, respectively.

20. The axle assembly of claim 19 wherein the first arm has a greater length than the second arm.

* * * * *